UNITED STATES PATENT OFFICE.

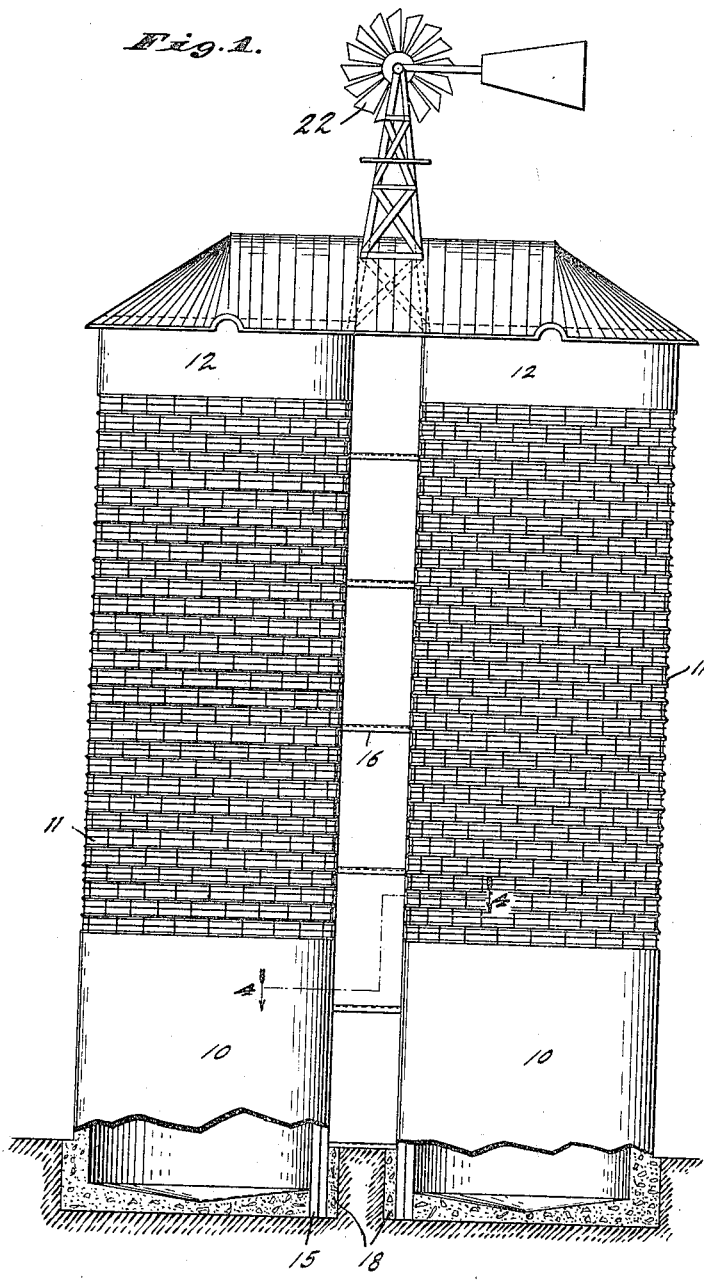
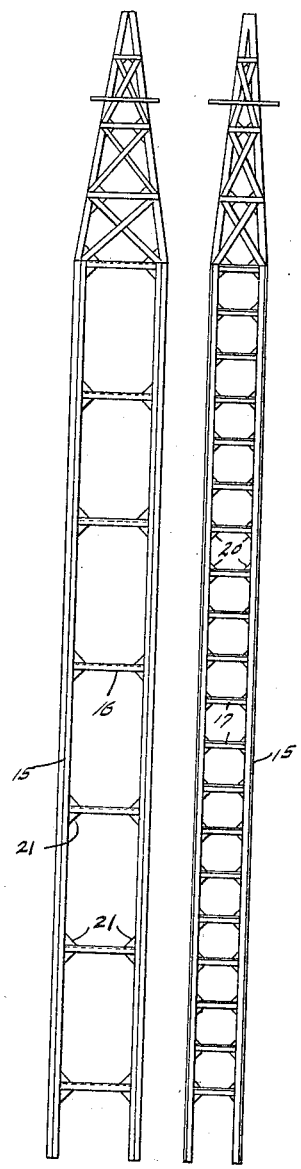

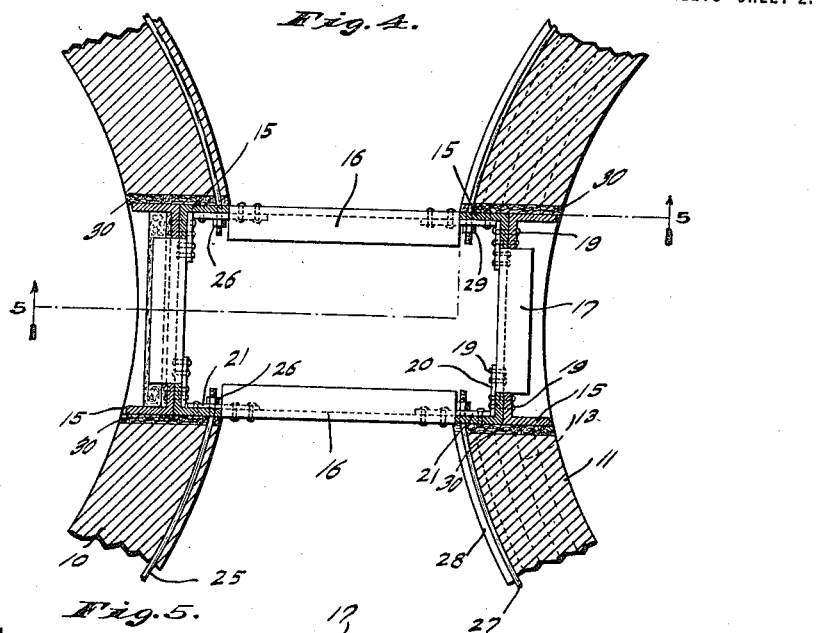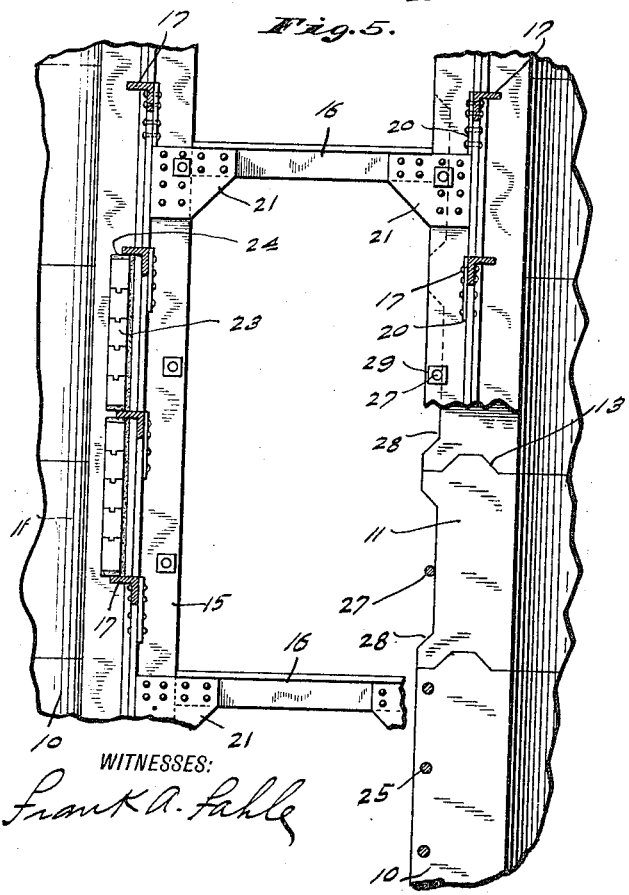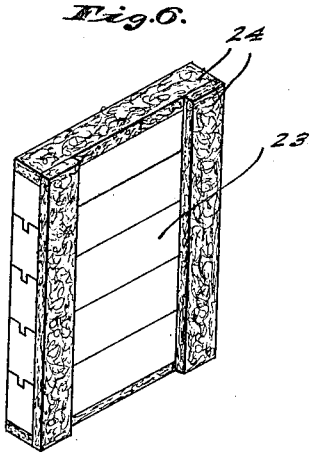

GEORGE M. CHENEY, OF INDIANAPOLIS, INDIANA.

SILO.

1,236,053. Specification of Letters Patent. Patented Aug. 7, 1917.

Application filed June 1, 1915. Serial No. 31,347.

*To all whom it may concern:*

Be it known that I, GEORGE M. CHENEY, a citizen of the United States, residing at Indianapolis, in the county of Marion and State of Indiana, have invented a new and useful Silo, of which the following is a specification.

In the modern development of silos, there has been a tendency to increase the hight of a silo. In consequence, the modern high silos are being subjected to greater stresses, as from wind pressure, slight earth movements, etc., than the earlier silos, and therefore must be more rigidly constructed in order to withstand such stresses.

It is the object of my present invention to provide a silo structure which shall be comparatively inexpensive to construct, and yet shall be rigid although built to hights exceeding those of the silos even now being constructed.

In carrying out my invention, I make what may be called a "semi-monolithic" silo. In this there is a cup shaped monolithic base of concrete extending to a suitable hight, a superstructure of concrete blocks resting upon and conforming in shape to the hollow base, and an annular monolithic cap of suitable hight resting upon and conforming in shape to the subjacent portion of concrete blocks. I also provide a tower of structural steel set in a concrete base, one side of this tower being set in and forming part of the silo wall and the remaining sides being located outside the figure of the silo proper. The circular reinforcements of the silo, which may be hoops surrounding the outside of the silo or reinforcing wires or hoops embedded in the concrete of the silo when concrete is used, are fastened to this tower so that the tower likewise forms part of the reinforcing system. Preferably, when the tower is used in connection with the semi-monolithic silo just described, the reinforcing hoops in the monolithic parts of the silo are embedded therein, and the reinforcements for the concrete blocks bear against the outside surfaces of such blocks, both the embedded and the exposed rods being attached to the tower, conveniently by nuts on the ends of the rods, so that the rods, or at least the exposed rods, can be tightened as required. The tower provides the door openings along the side of the silo, and serves not only as a reinforcement for the silo but also as a chute for conveying the ensilage to the ground. If desired, a wind mill may be mounted on the top of this tower. It is also desirable to have two silos on opposite sides of and connected to a single tower, whereby each silo in some measure strengthens the other by their joint actions and reactions on the tower.

The accompanying drawing illustrates my invention. In this drawing Figure 1 is an elevation, with the base in section, of twin silos and a single reinforcing tower constructed in accordance with my invention; Fig. 2 is a side elevation of the tower itself; Fig. 3 is an elevation of the tower itself showing the side toward the silo; Fig. 4 is a section on the line 4—4 of Fig. 1, showing fragments of the two silos; Fig. 5 is a section on the line 5—5 of Fig. 4; and Fig. 6 is a perspective view of one of the silo doors.

Each of the two silos shown in Fig. 1 consists of a cup-shaped and preferably round monolithic base portion 10 of reinforced concrete, an annular and preferably round intermediate portion 11 of concrete blocks, mounted upon and conforming in shape to the wall of the hollow monolithic base portion, and an annular monolithic cap 12 which is mounted upon and conforms in shape to the subjacent intermediate portion of concrete blocks. The base portion 10 may extend any desired distance above and below the ground, but preferably extends into the ground below the front line and above the ground sufficiently high so that its upper edge is higher than an ordinary farm wagon. The intermediate portion 11 extends to within a comparatively few feet of the top of the silo, and the cap portion 12 occupies these few feet. Silos as much as one hundred feet high, or even higher, may be built by the use of my invention. The concrete blocks of the intermediate portion 11 are laid in courses, breaking joints in the usual manner, and preferably the upper and lower edges of the blocks 11, the upper edge of the base 10, and the lower edge of the cap 12 have interfitting portions, such as the tongue and groove 13 shown at the right of Fig. 5, the tongues preferably being uppermost for preventing any possible collection of water.

The reinforcing tower is of structural steel and consists of a number of spaced uprights 15, conveniently four in number, interconnected by cross braces 16 and 17. These uprights are set in a concrete foundation 18 in the ground. If desired, this concrete foundation 18 may be monolithic with the base portions 10 of the associated silo or silos. Two of the uprights 15 are set in the wall of each silo, preferably coming flush both with the inside and outside surfaces of such wall throughout the portions 10, 11, and 12, as is clear from Fig. 4. These uprights 15 are conveniently formed of two angle irons riveted together by rivets 19. The cross pieces 17 join the two uprights 15 of a pair set in either silo wall, being fastened to such uprights by plates 20 riveted to both the uprights and to the cross pieces by the rivets 19. Successive cross pieces 17 are spaced apart to form the door openings for removing the ensilage from within the silo, and also space apart the two uprights 15 of a pair. The cross pieces 16 connect the two pairs of uprights 15 set in the walls of the two silos, when the two silos are associated with a single tower, and project outward from the silo walls; they are likewise angle irons, conveniently being connected to the uprights 15 by plates 21 riveted to both the uprights and the cross pieces. The cross pieces 16 may serve as supports for any suitable siding for closing the sides of the tower. This siding may, for instance, be galvanized iron. Thus the tower forms a chute for the ensilage. The tower preferably extends above the top of the silos 10, and may there carry a wind wheel 22 for operating any desired apparatus.

The cross pieces 17 serve as supports for the doors 23, which may be of any suitable character. Conveniently these doors consist of a number of tongued and grooved boards, as shown in Fig. 6, suitably fastened together and provided with some yielding material 24, such as felt or rubber, across their upper and lower edges, and along their outer vertical faces at the edges, for fitting against the uprights 15 and the cross pieces 17.

The tower not only serves as a vertical reinforcement for the silos, by having its sides form parts of the walls of the silo, but also serves as a fastening for and as part of the circumferential reinforcements. In the semi-monolithic silo shown, I prefer to embed in the monolithic parts 10 and 12 a series of reinforcing tension rods 25, which are preferably located near the outer surfaces of such portions, as is clear from Fig. 5. These rods extend to and through the uprights 15 at the side of the door openings, and their projecting ends are threaded to receive nuts 26 for fastening them firmly in place to the uprights. I also prefer to provide encircling wire hoops 27 for the concrete block portion 11; these encircling hoops bearing against the outer surfaces of such blocks 11, one hoop conveniently being provided for each course of concrete blocks. The outer surfaces of the blocks are preferably provided with recesses 28 for receiving these encircling hoops 27. The hoops 27 also extend to and through the uprights 15, and their projecting ends are threaded to receive nuts 29, which serve to clamp the hoops 27 firmly to the uprights and to tighten the hoops when they become slack.

If desired, a layer of asphalt felt 30 may be placed in the joint between the uprights 15 and the adjacent edges of the concrete wall, as is clear from Fig. 4. This provides a tight joint, and also by reason of its resiliency permits the expansion and contraction of the parts, as under varying weather conditions, without any loosening of such joint.

I claim as my invention:

A pair of silos with skeleton tower, uprights embedded in the adjacent sides of the silos, the lower portions of the uprights set in a concrete base, and the structure held together by the transverse parts of the skeleton tower.

In witness whereof, I have hereunto set my hand at Indianapolis, Indiana, this twenty-eighth day of May, A. D. one thousand nine hundred and fifteen.

GEORGE M. CHENEY.

Copies of this patent may be obtained for five cents each, by addressing the "Commissioner of Patents, Washington, D. C."